United States Patent [19]

Rabatin

[11] 4,374,905
[45] Feb. 22, 1983

[54] X-RAY INTENSIFYING SCREEN

[75] Inventor: Jacob G. Rabatin, Chardon, Ohio

[73] Assignee: General Electric Company, Schenectady, N.Y.

[21] Appl. No.: 951,464

[22] Filed: Oct. 16, 1978

Related U.S. Application Data

[63] Continuation-in-part of Ser. No. 749,996, Dec. 13, 1976, abandoned.

[51] Int. Cl.$^3$ ............................................. C09K 11/475
[52] U.S. Cl. .................................... 428/691; 428/913; 250/483.1; 252/301.4 H; 252/301.4 S; 252/301.6 S
[58] Field of Search ................... 252/301.6 S, 301.4 S, 252/301.4 H, 301.6; 423/267 R; 427/64, 65, 71, 157, 160, 215; 428/403, 539; 250/483

[56] References Cited

U.S. PATENT DOCUMENTS

| | | | |
|---|---|---|---|
| 2,421,208 | 5/1947 | Leverenz | 252/301.4 H X |
| 3,023,313 | 2/1962 | De La Mater et al. | 427/65 X |
| 3,070,435 | 12/1962 | Reusser et al. | 423/267 |
| 3,617,743 | 11/1971 | Rabatin et al. | 252/301.4 H X |
| 3,795,814 | 3/1974 | Rabatin | 252/301.4 H X |
| 4,020,231 | 4/1977 | Hedler et al. | 428/403 |
| 4,138,361 | 2/1979 | Suys et al. | |

FOREIGN PATENT DOCUMENTS 999780  7/1965  United Kingdom .................. 427/64

Primary Examiner—Jack Cooper
Attorney, Agent, or Firm—John F. McDevitt

[57] ABSTRACT

Improved performance of rare earth oxyhalide phosphors in x-ray image intensifying screens may be realized by admixing a small but effective amount of inorganic salts such as $MgSO_4$ or $ZnSO_4$ with the phosphor prior to the preparation of the screen. It is believed that $H+$ and $SO_4=$ ions are present in a protective surface film surrounding each phosphor particle to help preserve the original emission brightness of the phosphor when exposed to humidity as well as reduce attack by volatile organic components which migrate from an associated photographic film.

1 Claim, 1 Drawing Figure

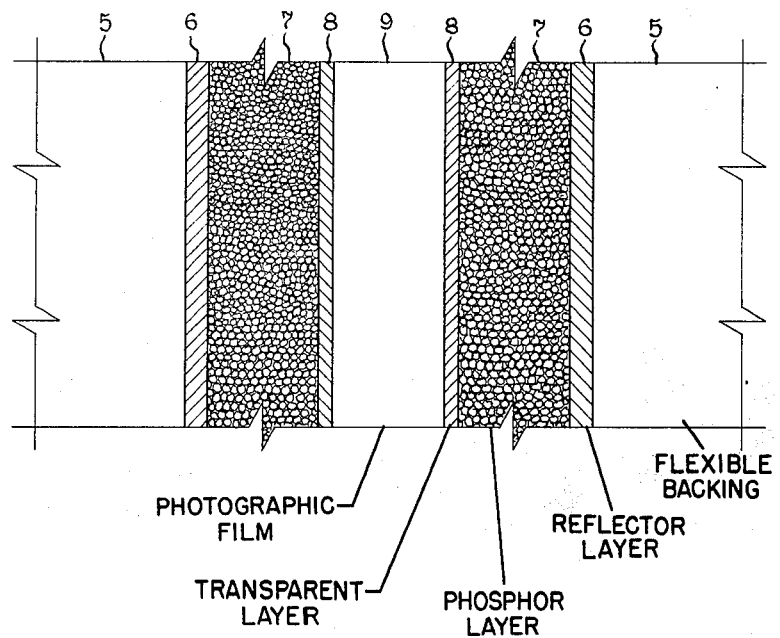

X-RAY INTENSIFYING SCREEN

This application is a continuation-in-part of my application Ser. No. 749,996, filed Dec. 13, 1976, and now abandoned.

FIELD OF THE INVENTION

The present invention relates to phosphors for x-ray image intensifying screens and more particularly to an additive for improving the emission brightness of a rare earth oxyhalide phosphor where used in such screens.

BRIEF DESCRIPTION OF THE PRIOR ART

Rare earth oxyhalides have been employed as phosphors for x-ray image converters for some time. The structure of a multi-layer intensifier screen utilizing such phosphors is disclosed in U.S. Pat. No. 3,936,644 to the present inventor. A process for producing rare earth oxyhalides is disclosed in U.S. Pat. No. 3,591,516, also to the present inventor. Various x-ray image converter devices utilizing rare earth oxyhalide phosphors are disclosed and claimed in further U.S. Pat. Nos. 3,617,743 and 3,795,814 of the present inventor. In this mentioned prior art, oxyhalides of lanthanum and gadolinium are disclosed in conjunction with phosphor activating materials. Two specific phosphors commercially available are LaOBr:Tb and LaOBr:Tm. In normal environmental situations, special moisture reducing provisions need not be implemented to protect the screen phosphor. However, in humid climates, moisture has a deleterious effect on the phosphor so that special environmental controls, such as air conditioning and dehumidification are necessary in places where the screens are stored, used and processed. As will be appreciated, in many places such rigorous environmental control is not possible. Accordingly, it is desirable to prepare the phosphor material itself to be moisture resistant.

An entirely different problem is encountered during use of said x-ray image intensifier screens and which is attributable to discoloration of the phosphor layer by volatile organic constituents escaping from the associated photographic film. Specifically, the photographic film that is customarily positioned next to the phosphor layer in said screen construction during use includes volatile organic compounds which migrate into the screen and discolor in the polymer binder of the phosphor layer. Such interraction reduces the screen speed significantly in as short a time duration as a few days and can thereby represent a more serious performance problem than experienced from phosphor brightness loss attributable to moisture attack. Understandably, tnese problems are of a different nature since moisture attack produces degradation of the phosphor material itself whereas the discoloration in the phosphor layer produced by volatilized photographic film constituents is limited to discoloration with no loss of phosphor efficiency.

It would be further desirable, therefore, to solve both of said problems in a convenient and effective manner which does not involve an elaborate modification of the present type x-ray screen constructions.

BRIEF DESCRIPTION OF THE PRESENT INVENTION

In the present invention, additives are admixed with a rare earth oxyhalide phosphor prior to the preparation of the x-ray image converter device. The additives are inorganic salts selected from $MgSO_4$ and $ZnSO_4$. It is suspected that $H^+$ and $SO_4^{--}$ ions in a moisture film surround each phosphor particle providing an acidic protective environment for the particles. Surprisingly, said protection also resists discoloration occurring in the phosphor layer of the fabricated x-ray screen when used with customary photographic film. Although the original film speed can also be restored by treating a discolored screen with chemical bleaching agents, it is understandably better to resist said discoloration as hereinafter pointed out.

BRIEF DESCRIPTION OF THE DRAWING

The drawing is a cross section of an enlarged view of a typical x-ray intensifying screen utilizing the present invention.

DETAILED DESCRIPTION OF THE INVENTION

The FIGURE shows an arrangement consisting of a double emulsion photographic film 9 which is sandwiched between two x-ray intensifying screens. The screens are constructed of a flexible backing 5, a reflector layer 6, a phosphor layer 7 to which this invention relates and a transparent top layer 8. It is to be emphasized that the particular construction shown in the FIGURE is merely exemplary and is not intended to be a limitation on the invention. Rather, the invention resides in the preparation of the phosphor to render it moisture resistant as well as exhibiting improved retention of original film speed when utilized in an x-ray screen construction. The following discussion will relate to the phosphor which will serve as a phosphor layer such as shown by 7 in the FIGURE.

In a preferred embodiment of the invention, the phosphor LaOBr is activated with thulium (Tm) or terbium (Tb). As an example of the process for making the improved performance phosphor for x-ray screens, certain anhydrous salts were selected which form stable non-hydroscopic hydrates. These were added from none to 4 weight percent of the phosphor weight. Standard formulations were used. An example follows for a 1 quart mill formulation:

260 gm. LaOBr 0.003 Tm
30 gm. Elvacite 2045
10 gm. Hycar (20% solution)
50 gm. Methyl Ethyl Ketone
50 gm. Methyl Isobutyl Ketone
5.2 g. Anhydrous $MgSO_4$ The phosphor, solvents and $MgSO_4$ are premilled 1 hour, then Elvacite 2045 and Hycar polymer binders are added and the materials are milled 4 hours. The suspension is filtered through 150 mesh screens. Coatings are doctor bladed onto a 10 mil thick mylar backing to give a final dry thickness of 4 mils and wherein the phosphor admixture was adhesively bonded with the polymer binders used. A 0.3 mil clear layer of polyvinyl butyral is placed on top of said phosphor layer.

MEASUREMENTS OF ACCELERATED HUMIDITY

In order to determine the effect of these inorganic salts on the moisture resistance of phosphors such as LaOBr in x-ray intensifying screens. 2½ inch square screens were placed in a humidity chamber set at 50° C. and 90% relative humidity for accelerated moisture resistance tests. The accelerated rate is at least 80 times the rate at 20° C. and 50% relative humidity usually encountered in air-conditioned x-ray rooms. Periodically the screens were removed, examined and read for brightness under x-ray excitation at 80 KV peak. The results are presented in Table I which shows the number of days for which the brightness was still 100% of original brightness and the number of days to near zero brightness after the accelerated humidity tests were begun.

TABLE I

Effect of MgSO$_4$ on Moisture Resistance of LaOBr Phosphors in X-Ray Intensifying Screens

| Screen No. | Weight % MgSO$_4$ | Days at 100% Brightness | Days to 0% Brightness |
|---|---|---|---|
| 1 | None | 12 days | 18 days |
| 2 | 0.5% | 63 | 171 |
| 3 | 1.0% | 73 | 171 |
| 4 | 2.0% | 91 | >171 |
| 5 | 4.0% | 91 | >171 |

As can readily be calculated from the data in Table I, MgSO$_4$ improves the moisture resistance of LaOBr phosphors in x-ray screens by factors ranging between 5 to over 7. This translates, approximately, to over 7 to 10 years of effective life of these screens in moderately humid conditions.

Another inorganic salt has been found to extend screen life and retain original film speed. When ZnSO$_4$·H$_2$O is used as an additive, the screen life is extended by a factor of 2.

FILM SPEED MEASUREMENTS

Other x-ray screens were constructed in the same general manner above described for examination of resistance to loss in screen speed resulting from discoloration when the phosphor layer remained in continued physical contact with conventional photographic film. Accordingly, said screens were subjected to accelerated test conditions wherein film-screen pairs were placed in a humidity chamber being maintained at 50° C. and 90% relative humidity for a week during which time period the film was changed three times. Interim testing of the exposed film-screen pairs by x-ray brightness measurement in the same manner above described produced the results listed in Table II.

TABLE II

Original Brightness Retention of Film-Screen Pairs

| Screen-Pair No. | Wt. % MgSO$_4$ | Days at 90% of Original Brightness |
|---|---|---|
| 6 | None | 4 days |
| 7 | None | 3 |
| 8 | 1.0% | 9 |

As can be readily determined from the Table II results, the resistance to discoloration and screen speed loss which is imparted by the phosphor admixtures of the present invention significantly further extends screen life. Since a further comparison of said results with the x-ray brightness measurements reported in Table I above evidences greater brightness loss from discoloration compared with moisture attack, the performance improvement herein demonstrated is quite substantial.

THEORETICAL PROTECTIVE MECHANISM

At the present time, it is suspected that the following theory explains the protective action of these salt additives to improving the moisture resistance and performance of the mentioned phosphors in x-ray screens. It is to be emphasized that the theory is inconclusive at the present time. However, it is certain that the invention is operative as the data above proves. With respect to the theory, it is assumed that the presence of both H$^+$ and SO$_4^=$ ions in moisture film surrounding each particle provides the protective environment. In the micro and incipient stages of moisture attack, it is possible that the following occurs for MgSO$_4$:

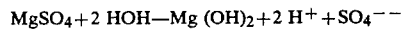

$$MgSO_4 + 2\ HOH \longrightarrow Mg(OH)_2 + 2\ H^+ + SO_4^{--}$$

The Mg(OH)$_2$ precipitate is physically removed from the incipient solution phase and the moisture film is now acidic resulting in protective action against moisture attack.

The protective action afforded in the foregoing manner further serves to maintain the original film speed or brightness when said phosphor admixtures are utilized in x-ray screens. Since the discoloration responsible for film speed or brightness loss has been observed to take place in the polymer binder constituent of the phosphor layer, it can be concluded therefrom that some form of chemical interraction otherwise occurring between the phosphor itself, if not protected, and the migration products in binder material has been prevented or at least retarded. It would also follow that such protective action in retarding moisture attack upon the phosphor as well as polymer discoloration would not be expected.

What I claim as new and desire to secure by Letters Patent of the United States is:

1. An improved x-ray screen including a backing member coated with a physical admixture of a rare earth oxyhalide phosphor selected from lanthanum oxyhalide and gadolinium oxyhalide activated by T$_x$ wherein T$_x$ is chosen from Tm and Tb and an inorganic salt selected from MgSO$_4$ and ZnSO$_4$ added in sufficient quantity from a small but effective amount up to 4 weight percent based on the phosphor weight to retain original emission brightness for a longer time period than for said phosphor without said inorganic salt, said admixture further being adhesively bonded with a polymer binder to said backing member, and said improved x-ray screen resisting loss in film speed and brightness when associated with photographic film.

* * * * *